US010747033B2

(12) United States Patent
DeMuth et al.

(10) Patent No.: US 10,747,033 B2
(45) Date of Patent: Aug. 18, 2020

(54) COOLER FOR OPTICS TRANSMITTING HIGH INTENSITY LIGHT

(71) Applicant: LAWRENCE LIVERMORE NATIONAL SECURITY, LLC, Livermore, CA (US)

(72) Inventors: James A. DeMuth, Livermore, CA (US); Eric B. Duoss, Dublin, CA (US); Joshua D. Kuntz, Livermore, CA (US); Paul A. Rosso, Livermore, CA (US); Christopher M. Spadaccini, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 846 days.

(21) Appl. No.: 15/010,188

(22) Filed: Jan. 29, 2016

(65) Prior Publication Data
US 2017/0219855 A1    Aug. 3, 2017

(51) Int. Cl.
*G02F 1/13*    (2006.01)
*B33Y 30/00*   (2015.01)
(Continued)

(52) U.S. Cl.
CPC ............ *G02F 1/132* (2013.01); *B22F 3/1055* (2013.01); *B29C 64/268* (2017.08); *B33Y 30/00* (2014.12);
(Continued)

(58) Field of Classification Search
CPC ..................................................... G02F 1/132
See application file for complete search history.

(56) References Cited

U.S. PATENT DOCUMENTS 4,163,199 A * 7/1979 Treanor ............... H01S 3/095
                                                        372/35
4,247,508 A   1/1981 Housholder
(Continued)

FOREIGN PATENT DOCUMENTS

JP   03258480 B2   11/1991
JP   H071593 A     1/1995
(Continued)

OTHER PUBLICATIONS

International Search Report and Written Opinion for PCT/US16/069114, corresponding to U.S. Appl. No. 15/010,188, 13 pages.
(Continued)

*Primary Examiner* — Ljiljana V. Ciric
(74) *Attorney, Agent, or Firm* — Harness, Dickey & Pierce, P.L.C.

(57) ABSTRACT

A system and an apparatus having an optic and a cooling system for cooling the optic. In one example an optically addressed light valve forms the optic. The cooling system includes first and second windows on opposing surfaces of the optically addressed light valve which constrain a cooling fluid to flow over the opposing surfaces. The fluid pressure outside the optically addressed light valve is low enough that it does not compress a liquid crystal gap of the optically addressed light valve. The cooling fluid is also transparent to a high powered light beam which is projected through the first and second windows, and also through the optically addressed light valve, during an additive manufacturing operation.

21 Claims, 4 Drawing Sheets

(51) Int. Cl.
  *B29C 64/268* (2017.01)
  *G02F 1/135* (2006.01)
  *G02F 1/01* (2006.01)
  *B22F 3/105* (2006.01)

(52) U.S. Cl.
  CPC ............ *G02F 1/0126* (2013.01); *G02F 1/135* (2013.01); *B22F 2003/1056* (2013.01)

(56) References Cited

U.S. PATENT DOCUMENTS

| | | | |
|---|---|---|---|
| 4,944,817 A | 7/1990 | Bourell et al. | |
| 5,155,324 A | 10/1992 | Deckard et al. | |
| 5,236,637 A | 8/1993 | Hull | |
| 5,255,029 A * | 10/1993 | Vogeley | G03B 21/132 |
| | | | 353/122 |
| 5,282,121 A * | 1/1994 | Bornhorst | F21V 29/70 |
| | | | 362/294 |
| 5,314,003 A | 5/1994 | Mackay | |
| 5,382,308 A | 1/1995 | Bourell et al. | |
| 5,393,482 A | 2/1995 | Benda et al. | |
| 5,640,667 A | 6/1997 | Freitag et al. | |
| 5,674,414 A | 10/1997 | Schweizer | |
| 5,758,956 A * | 6/1998 | Bornhorst | F21S 10/007 |
| | | | 362/294 |
| 5,837,960 A | 11/1998 | Lewis et al. | |
| 5,940,420 A * | 8/1999 | Blair | H01S 3/042 |
| | | | 372/35 |
| 6,054,192 A | 4/2000 | Otsuka et al. | |
| 6,215,093 B1 | 4/2001 | Meiners et al. | |
| 6,280,038 B1 * | 8/2001 | Fuse | G03B 21/16 |
| | | | 348/E9.027 |
| 6,806,897 B2 * | 10/2004 | Kataoka | B41J 29/377 |
| | | | 347/255 |
| 7,088,432 B2 | 8/2006 | Zhang | |
| 7,509,738 B2 | 3/2009 | Adams et al. | |
| 7,540,632 B2 * | 6/2009 | Maner | F21V 9/20 |
| | | | 362/293 |
| 7,648,245 B2 * | 1/2010 | Park | G03B 21/16 |
| | | | 348/748 |
| 8,317,336 B2 * | 11/2012 | Noda | G03B 21/16 |
| | | | 348/748 |
| 9,107,434 B2 | 8/2015 | Singh | |
| 9,192,056 B2 | 11/2015 | Rubenchik et al. | |
| 9,308,583 B2 | 4/2016 | El-Dasher et al. | |
| 9,362,705 B2 * | 6/2016 | Xuan | H01S 3/0815 |
| 9,855,625 B2 | 1/2018 | El-Dasher et al. | |
| 2002/0015305 A1 * | 2/2002 | Bornhorst | F21V 9/40 |
| | | | 362/293 |
| 2002/0093115 A1 | 7/2002 | Jang et al. | |
| 2003/0025659 A1 * | 2/2003 | Kondo | G02F 1/13454 |
| | | | 345/87 |
| 2003/0086453 A1 * | 5/2003 | Nolan | H01S 5/02423 |
| | | | 372/35 |
| 2003/0151795 A1 | 8/2003 | Braun et al. | |
| 2003/0198264 A1 * | 10/2003 | Vetrovec | H01S 3/042 |
| | | | 372/35 |
| 2004/0200812 A1 | 10/2004 | Grewell et al. | |
| 2005/0083498 A1 | 4/2005 | Jeng | |
| 2005/0104541 A1 | 5/2005 | Bushell et al. | |
| 2007/0122560 A1 | 5/2007 | Adams | |
| 2007/0160094 A1 | 7/2007 | Betin et al. | |
| 2007/0126985 A1 | 9/2007 | Woodall et al. | |
| 2008/0198883 A1 * | 8/2008 | Vetrovec | F41H 13/005 |
| | | | 372/35 |
| 2009/0020901 A1 | 1/2009 | Schillen | |
| 2009/0185592 A1 * | 7/2009 | Vetrovec | H01S 5/024 |
| | | | 372/35 |
| 2010/0140849 A1 | 6/2010 | Comb et al. | |
| 2010/0176539 A1 | 7/2010 | Higashi et al. | |
| 2010/0200199 A1 | 8/2010 | Habib et al. | |
| 2010/0323301 A1 | 12/2010 | Tang | |
| 2011/0019705 A1 | 1/2011 | Adams et al. | |
| 2011/0033887 A1 | 2/2011 | Fang et al. | |
| 2011/0190904 A1 | 8/2011 | Lechmann et al. | |
| 2013/0001834 A1 | 1/2013 | El-Siblani et al. | |
| 2013/0004680 A1 | 1/2013 | Godfrey et al. | |
| 2013/0095603 A1 | 4/2013 | Cabal | |
| 2013/0136868 A1 | 5/2013 | Bruck et al. | |
| 2013/0250985 A1 * | 9/2013 | Xuan | H01S 3/0815 |
| | | | 372/35 |
| 2014/0252687 A1 | 9/2014 | El-Dasher et al. | |
| 2015/0048075 A1 | 2/2015 | Pedrosa et al. | |
| 2019/0389132 A1 * | 12/2019 | Gir | B29C 64/393 |
| 2020/0094472 A1 * | 3/2020 | Brown | B33Y 10/00 |

FOREIGN PATENT DOCUMENTS

| | | |
|---|---|---|
| JP | 2001-504897 A | 4/2001 |
| JP | 2001137685 A | 5/2001 |
| JP | 2011504819 A | 2/2011 |
| JP | 2012145613 A | 8/2012 |
| WO | WO-2011111029 A1 | 9/2011 |
| WO | WO-2012125118 A1 | 9/2012 |
| WO | WO-2013024297 A1 | 2/2013 |

OTHER PUBLICATIONS

Helbert, John N. "Handbook of VLSI microlithography". 2d Ed., Hoyes Publications, New York, NY (2001).

Tolochko, N. K., Laoui, T., Khlopkov, Y. V., Mozzharov, S. E., Titov, V.I., and Ignatiev, M. B., "Absorptance of powder materials suitable for laser sintering". Rapid Prototyping Journal, vol. 6, No. 3 (2000), pp. 155-160.

Extended European Search Report for corresponding Application No. 168885886 dated Jul. 10, 2019, 13 pp.

* cited by examiner

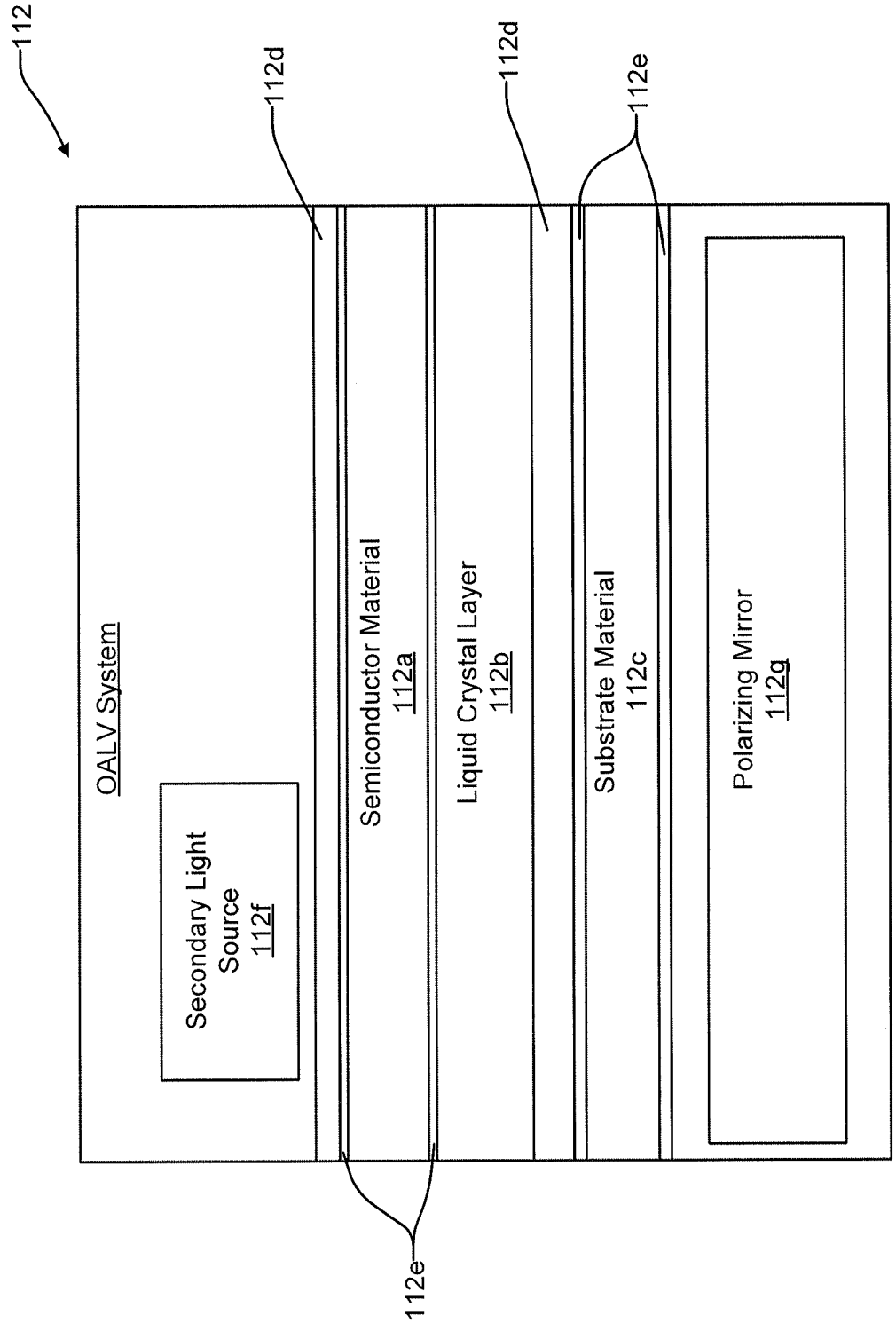

COOLER FOR OPTICS TRANSMITTING HIGH INTENSITY LIGHT

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to the thermal management of optics, in particular light valves and more particularly to a cooler for continuous light valve operation in additive manufacturing State of Technology This section provides background information related to the present disclosure which is not necessarily prior art.

U.S. Pat. No. 4,944,817 for multiple material systems for selective beam sintering issued Jul. 31, 1990 to David L. Bourell et al and assigned to Board of Regents, The University of Texas System provides the state of technology information reproduced below.

A method and apparatus for selectively sintering a layer of powder to produce a part comprising a plurality of sintered layers. The apparatus includes a computer controlling a laser to direct the laser energy onto the powder to produce a sintered mass. The computer either determines or is programmed with the boundaries of the desired cross-sectional regions of the part. For each cross-section, the aim of the laser beam is scanned over a layer of powder and the beam is switched on to sinter only the powder within the boundaries of the cross-section. Powder is applied and successive layers sintered until a completed part is formed.

U.S. Pat. No. 5,155,324 for a method for selective laser sintering with layerwise cross-scanning issued Oct. 12, 1992 to Carl R, Deckard et al, University of Texas at Austin, provides the state of technology information reproduced below.

Selective laser sintering is a relatively new method for producing parts and other freeform solid articles in a layer-by-layer fashion. This method forms such articles by the mechanism of sintering, which refers to a process by which particulates are made to form a solid mass through the application of external energy. According to selective laser sintering, the external energy is focused and controlled by controlling the laser to sinter selected locations of a heat-fusible powder. By performing this process in layer-by-layer fashion, complex parts and freeform solid articles which cannot be fabricated easily (if at all) by subtractive methods such as machining can be quickly and accurately fabricated. Accordingly, this method is particularly beneficial in the production of prototype parts, and is particularly useful in the customized manufacture of such parts and articles in a unified manner directly from computer-aided-design (CAD) or computer-aided-manufacturing (CAM) data bases.

Selective laser sintering is performed by depositing a layer of a heat-fusible powder onto a target surface; examples of the types of powders include metal powders, polymer powders such as wax that can be subsequently used in investment casting, ceramic powders, and plastics such as ABS plastic, polyvinyl chloride (PVC), polycarbonate and other polymers. Portions of the layer of powder corresponding to a cross-sectional layer of the part to be produced are exposed to a focused and directionally controlled energy beam, such as generated by a laser having its direction controlled by mirrors, under the control of a computer. The portions of the powder exposed to the laser energy are sintered into a solid mass in the manner described hereinabove. After the selected portions of the layer have been so sintered or bonded, another layer of powder is placed over the layer previously selectively sintered, and the energy beam is directed to sinter portions of the new layer according to the next cross-sectional layer of the part to be produced. The sintering of each layer not only forms a solid mass within the layer, but also sinters each layer to previously sintered powder underlying the newly sintered portion. In this manner, the selective laser sintering method builds a part in layer-wise fashion, with flexibility, accuracy, and speed of fabrication superior to conventional machining methods.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

When operating an Optically Addressed Light Valve (OALV) continuously in a diode additive manufacturing process with enough diode light to melt most metals, excessive optical absorption levels in the valve can begin to have significant thermal effects. The inventors have developed apparatus, systems, and methods to prevent the valve from overheating and leading to non-operation.

The inventors' apparatus, systems, and methods provide cooling of an optically addressed light valve such that the valve is temperature controlled. The fluid pressure outside the valve is low enough that it does not compress the liquid crystal gap. The cooling fluid is transparent to the high powered wavelength of light used in the printing process.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

FIG. 4 shows various components associated with the OALV system of FIG. 1;

DETAILED DESCRIPTION OF SPECIFIC EMBODIMENTS

Figure 1:
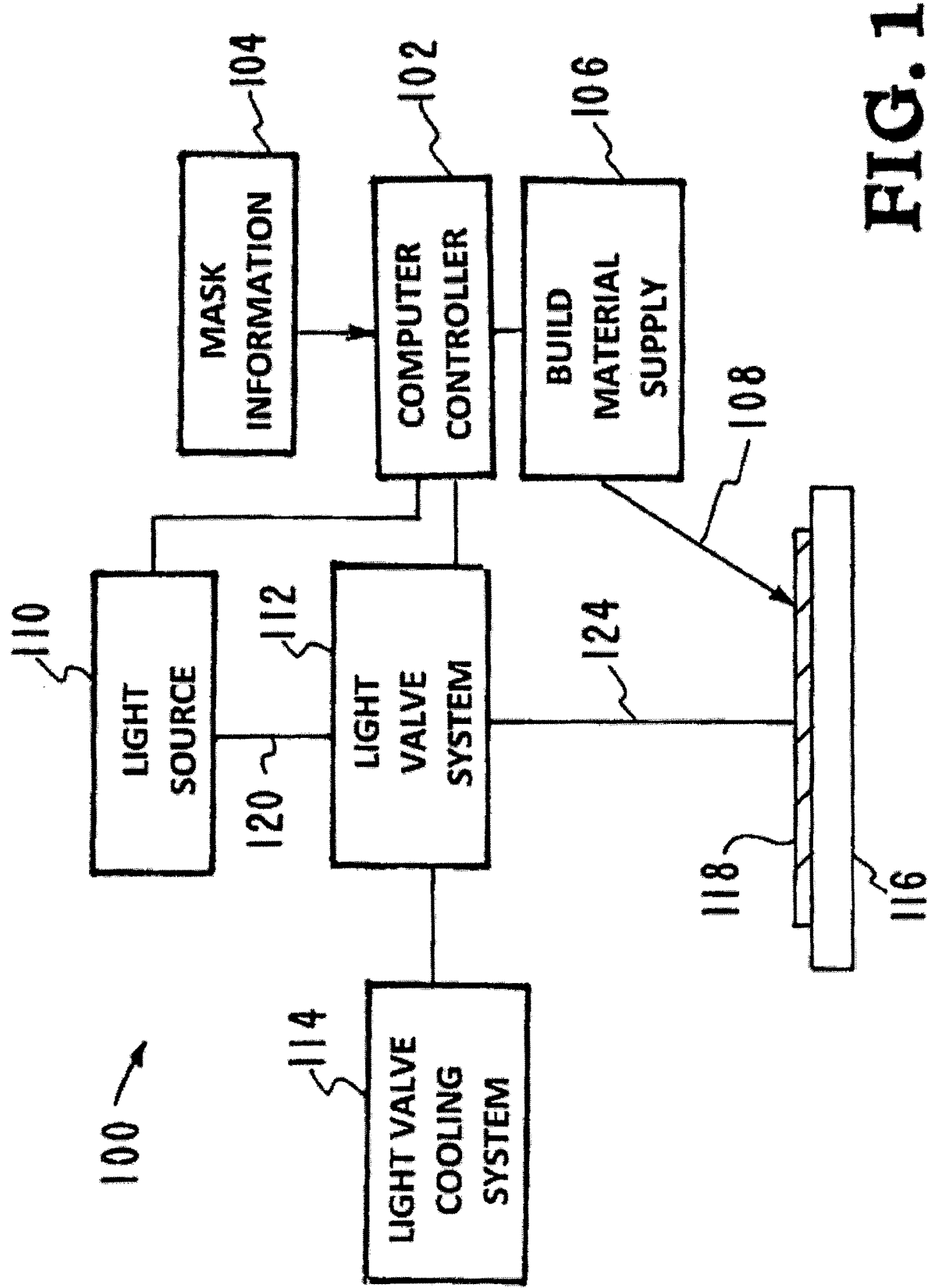
FIG. 1 illustrates one embodiment of the inventor's apparatus, systems, and methods.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Additive manufacturing, or 3D printing, is the process of turning digital designs into three-dimensional objects. It is a convenient and affordable way to make prototypes as well as finished products, making it popular with businesses, hobbyists and inventors. One of the 3D printing technologies is Powder Bed Fusion (PBF) which includes the Direct Metal Laser Sintering (DMLS), Electron Beam Melting (EBM), Selective Heat Sintering (SHS), Selective Laser Melting (SLM) and Selective Laser Sintering (SLS). A powder bed fusion (PBF) system uses a laser or electron beam to melt and fuse material powder together. Electron beam melting (EBM) methods require a vacuum but can be used with metals and alloys in the creation of functional parts. The Powder Bed Fusion processes involve the spreading of the powder material over previous layers.

Referring now to the drawings, embodiments of the inventors' apparatus, systems, and methods are illustrated that provide an optically addressed light valve (OALV) such that the valve is temperature controlled, the fluid pressure outside the valve is low enough that it does not compress the liquid crystal gap internal to the OALV, and that the cooling fluid is transparent to the high powered wavelength of light used in the printing process. This embodiment is designated generally by the reference numeral 100. The system 100 produces a final product as described below.

Initially a 3D model of the desired product is designed by any suitable method, e.g., by bit mapping or by computer aided design (CAD) software at a PC/controller. The CAD model of the desired product is electronically sliced into series of 2-dimensional data files, i.e. 2D layers, each defining a planar cross section through the model of the desired product. The 2-dimensional data files are stored in a computer and provide a digital image of the final product.

The digital images are used in the additive manufacturing system to produce the final product. Powder particles are applied to a substrate in a layer by layer process, melted and allowed to re-solidify to produce the final product. The digital image of the first 2D layer is used to produce the first layer of the desired product. The digital image of the first 2D layer is used to create a mask that only allows the desired portion of the laser beam to pass through the optically addressed light valve (OALV) system.

The OALV system, or simply "Light Valve System", is composed of a number of elements such as the OALV itself, a patterned light generating source such as a digital light projector (DLP) emitting a wavelength of light tuned to the absorption band of the semiconductor component of the OALV, and a polarizer mirror for splitting the light exiting the OALV and rejecting the polarization state of the light not desired, allowing the desired portion to continue on to the powder layer on the substrate.

Referring now to FIG. 1 a first embodiment of the inventor's apparatus, systems, and methods, and how they can be used in a larger additive manufacturing system, is illustrated. This embodiment is designated generally by the reference numeral 100. The embodiment 100 includes the components listed and described below.

Computer controller 102.
Mask information portion 104.
Build material supply 106.
Delivery system 108.
Light source 110.
Light valve system 112.
Light valve cooling system 114.
Substrate 116.
First layer of metal powder particles 118.
Light valve system component 120.
Projected beam 124.

As illustrated in FIG. 1, a computer controller 102 is used to perform the various operations of the system 100. A delivery system 108 directs metal powder particles from a material build supply 106 onto a substrate 116. A light source emits a projected beam 124 which is later directed onto the layer 118 of metal powder particles that have been deposited on the substrate 116. The digital image of the first 2D layer that has been stored in the mask information 104 portion of the computer controller 102 is used to produce the first layer 118 of the desired product.

The mask information 104 is directed to the light valve system 112. The light source 110 produces a light beam 120 which upon interaction with the light valve system 112 is split into two components. The component 120 represents the un-altered full laser beam emitted from the light source 110, the component 124 represents the portion of the light containing the digital image of the first 2D layer. The component which represents the portion of the light beam that is outside of the digital image of the first 2D layer is rejected from the system at this point, typically through a beam dump within the light valve system 112. The light valve system 112 acts as a dynamic mask and allows the portion 124 containing the digital image of the first 2D layer to pass while rejecting the component that is outside of the digital image of the first 2D layer.

The projected beam 124 containing the digital image of the first 2D layer is projected from the light valve system 112 onto the layer 118 of metal powder particles that has been deposited on the substrate 116. The projected beam 124 solidifies the metal powder particles according to the digital image of the first 2D layer information producing the finished first layer 118. Once the first layer 118 is completed production of the second layer of the product is started. A second layer of metal powder particles is applied on top of the competed first layer 118. This procedure is continued by repeating the steps and building the final product in a layer by layer process.

The OALV system 112 includes a semiconductor material 112a transparent to the high power light beam that can be optically stimulated to induce a change in semiconductor thermal conductivity. The OALV system 112 further includes a layer of liquid crystal 112b for rotating the polarization state of the high power light beam as it transmits through the OALV system, and a substrate material 112c transparent to the high power light beam. Optically transparent electrically conductive coatings 112d are included on the outside of the semiconductor material 112a, and between the liquid crystal 112b and the substrate material 112c. Anti-reflective coatings 112e are included on the two sides of the semiconductor material 112a, and on the two sides of the substrate material 112c.

The semiconductor material 112a is transparent to 1053 nm light. The substrate material 112c is also transparent to 1053 nm light. The liquid crystal 112b is formed from a twisted nematic E7. The transparent electrically conductive coatings 112d are Indium Tin Oxide (ITO). The emitted light beam is composed of light in one polarization state.

The OALV system 112 may also include a secondary light source 112f for projecting patterned light of a wavelength tuned to the absorption band of the semiconductor material 112a in the OALV system, and a polarizing mirror 112g capable of separating the orthogonal polarization states induced by polarization rotation of the light beam in the liquid crystal portion 112b of the OALV system 112.

The light valve system 112 is temperature controlled by a light valve cooling system 114. The light valve cooling system 114 uses a cooling fluid that is transparent to the wavelength of light in the high powered beam from the light source 110 used in the printing process.

When operating the light valve system 112 continuously in the additive manufacturing process with enough light energy to melt most metals, the small absorption levels in the light valve system 112 begin to have significant thermal effects. Absorption, if any, is typically due to higher than expected impurity levels in the OALV transparent glass or crystal components. If impurities are too high, excessive absorption of the light source 110 have been seen to occur, which can lead to overheating and non-operation. To prevent the light valve system 112 from overheating and leading to non-operation, significant cooling strategies must be implemented.

Figure 2:
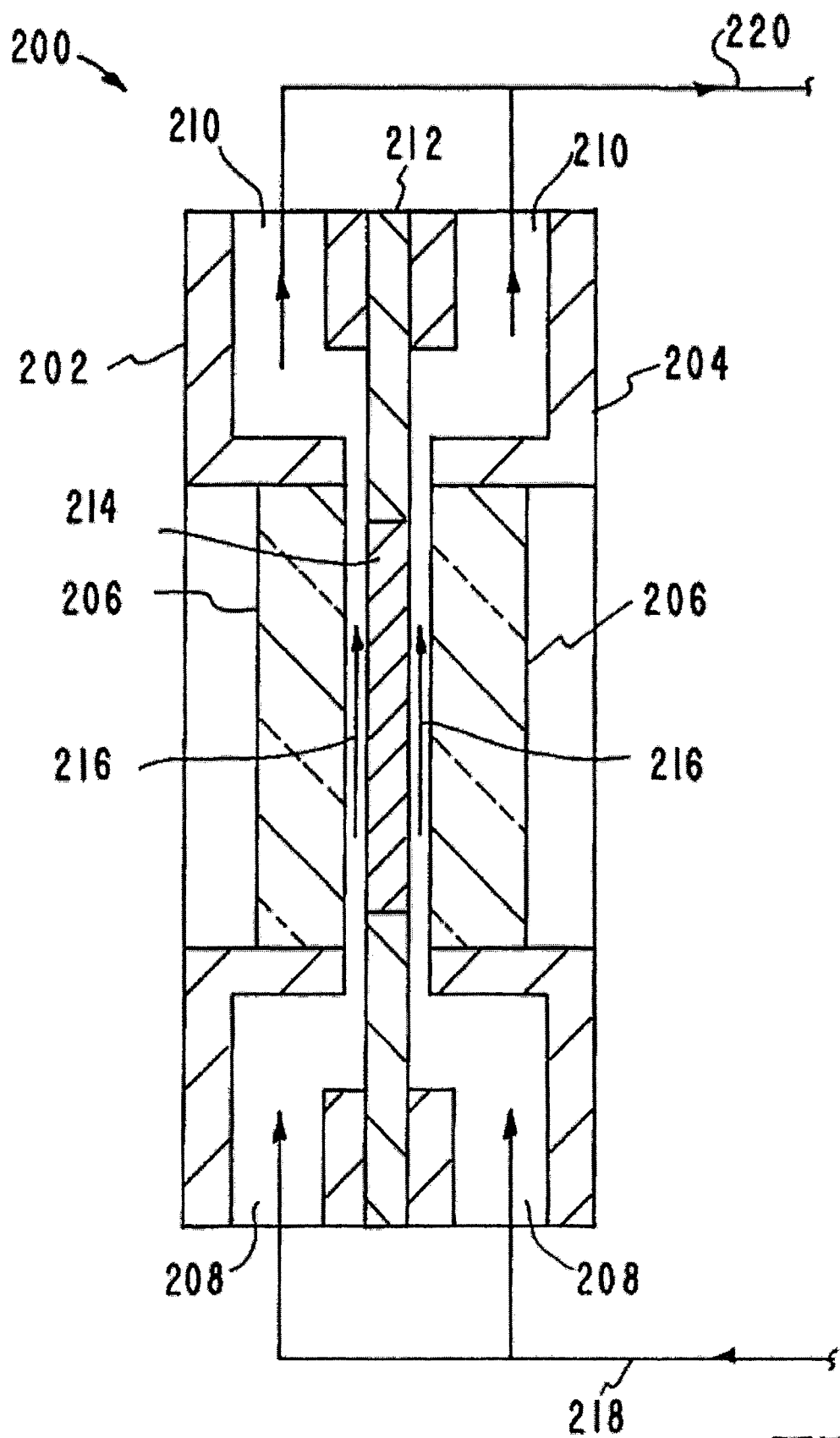
FIG. 2 shows the light valve cooling system in greater detail.

Referring to FIG. 2, the light valve cooling system 114 is shown in greater detail. A cross section 200 of the light valve cooling system 114 illustrates the circulation of a cooling fluid over the light valve system 112. The light valve cooling system 114, as evidenced by cross section 200, includes a first light valve cooling housing body part 202, a second light valve cooling housing body part 204, first and second windows 206, coolant inlet ports 208, coolant outlet ports 210, light valve center housing part 212, light valve 214 and first and second coolant flow paths 217 formed on opposite sides of the light valve 214, which communicate fluid from the coolant inlet ports 208, over both opposing surfaces of the light valve 214, and to the coolant outlet ports 210.

A supply line 218 from a coolant supply/heat exchanger directs cooling fluid into the light valve cooling system 114. A return line 220 directs the cooling fluid from the light valve cooling system 114 back into a coolant supply/heat exchanger (not shown explicitly in FIG. 2). The arrows 216 show the flow of the cooling fluid through the light valve cooling system 114.

Figure 3:
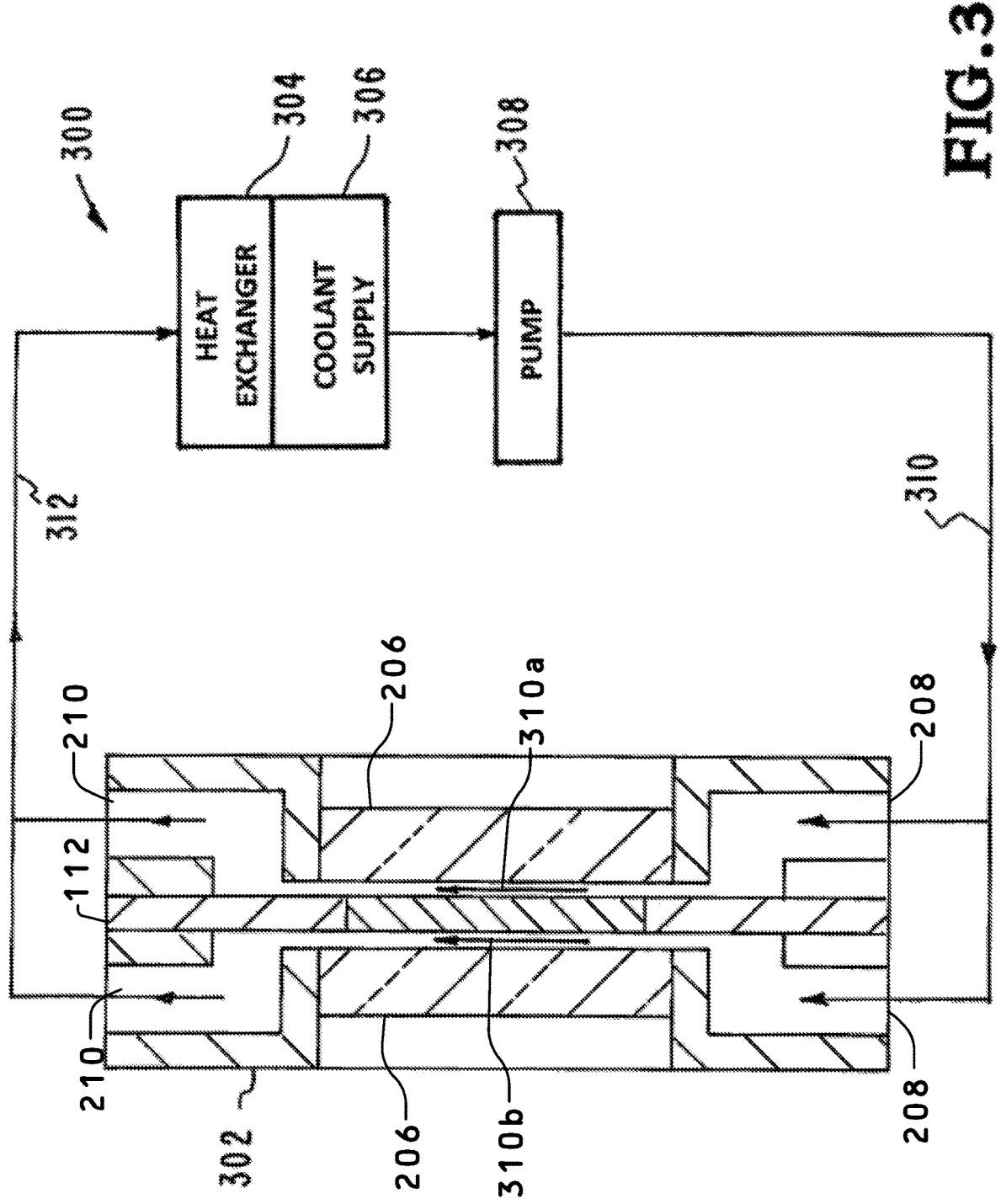
FIG. 3 illustrates a circulation system for cooling the light valve.

Referring to FIG. 3, a circulation system for cooling the light valve system 112 is illustrated. The light valve system 112 operates with enough light energy to melt most metals and the small absorption levels in the light valve system 112 begin to have significant thermal effects. To prevent the light valve system 112 from overheating a cooling fluid circulation system 300 circulates a fluid for cooling the light valve system 112 inside a light valve housing 302.

The cooling fluid circulation system 300 includes a heat exchanger 304, a coolant supply 306, a pump 308, a supply line 310, and a return line 312. The supply line 310 from the coolant supply 306 directs the cooling fluid into the light valve housing 302 in two flows 310a and 310b. The return line 312 directs the cooling fluid flows 310a and 310b from the light valve housing 302 into the heat exchanger 304. The heat exchanger 304 is part of the coolant supply.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The claims are:

1. An apparatus configured to transmit power fluxes sufficiently high for use in additive manufacturing a part, the apparatus comprising:
   an optic configured to be thermally managed,
   a light source configured to produce a light beam adapted to be directed through the optic,
   an optic cooling system in flow communication with said optic, the optic cooling system including first and second windows for sandwiching the optic between the first and second windows while allowing the light beam to pass through the windows, and
   wherein the first and second windows operate to contain a flowing cooling fluid in contact with, and flowing over, opposing surfaces of the optic, to help cool the optic, and where the cooling fluid is transparent to the light beam when the light beam is transmitted through the cooling fluid.

2. The apparatus of claim 1, wherein said light source comprises a laser, and said light beam comprises a laser beam having energy which is transferred to said optic as heat, and wherein said optic cooling system removes said heat from said optic.

3. The apparatus of claim 1, wherein said light source comprises a diode laser, and said light beam comprises a laser beam having heat, and wherein said heat is transferred to said optic, and wherein said optic cooling system removes said heat from said optic.

4. The apparatus of claim 1, wherein said optic comprises an optically addressed light valve including:
   a semiconductor material transparent to the light beam which is optically stimulated to induce a change in semiconductor conductivity,
   a layer of liquid crystal for rotating a polarization state of the light beam as the light beam transmits through the optically addressed light valve,
   a substrate material transparent to the light beam,
   optically transparent electrically conductive coatings on an outside of the semiconductor material, and between the layer of liquid crystal and the substrate material, and
   anti-reflective coatings on two opposing sides of the semiconductor material, and on two opposing sides of the substrate material.

5. The apparatus of claim 4 wherein said semiconductor material is transparent to 1053 nm light.

6. The apparatus of claim 4 wherein said substrate material is transparent to 1053 nm light.

7. The apparatus of claim 4, wherein said liquid crystal is made of twisted nematic E7.

8. The apparatus of claim 4, wherein said transparent electrically conductive coatings are made of Indium Tin Oxide.

9. The apparatus of claim 1 wherein said light beam is comprised of light in one polarization state.

10. The apparatus of claim 1, wherein said optic comprises an optically addressed light valve including:
    a semiconductor material:
    a liquid crystal portion for selectively rotating a polarization state of the light beam as the light beam transmits through the optically addressed light valve;
    a secondary light source for projecting patterned light of a wavelength tuned to an absorption band of the semiconductor material, and
    a polarizing mirror capable of separating orthogonal polarization states induced by polarization rotation of the light beam in the liquid crystal portion.

11. The apparatus of claim 1, wherein said optic cooling system includes a housing for housing said optic and receiving the cooling fluid in said housing.

12. The apparatus of claim 1, wherein:
    said optic cooling system includes a housing which places said cooling fluid in communication with said optic,
    wherein said cooling fluid is circulated in said housing, and
    wherein said apparatus further includes a heat exchanger in flow communication with said cooling fluid.

13. The apparatus of claim 1, wherein said optic cooling system includes:
    a housing which houses said optic,
    said cooling fluid,
    a circulation system for configured to circulate said cooling fluid in said housing,
    a pump operatively connected to said circulation system, and
    a heat exchanger operatively connected to said circulation system.

14. An apparatus configured to transmit power fluxes sufficiently high for carrying out an additive manufacturing operation to form a part from a powdered material, the apparatus comprising:
    an optic having opposing side surfaces;
    a light source configured to generate a light beam adapted to be directed through the optic; and
    an optic cooling system in flow communication with said optic, the optic cooling system including:
    first and second windows arranged adjacent to the opposing side surfaces of the optic, which sandwich the optic therebetween, and which contain a cooling fluid flowing through the optic cooling system in contact with the opposing side surfaces, and flowing over the opposing side surfaces of the optic while, still allowing passage of the light beam through the first and second windows and cross-sectionally through the optic, and
    where the cooling fluid is substantially transparent to the light beam when the light beam is transmitted through the cooling fluid.

15. The apparatus of claim 14, wherein the optic cooling system includes a housing having at least one inlet and at least one outlet.

16. The apparatus of claim 15, wherein the housing includes:
    a first housing body part;
    a second housing body part, the first and second housing body parts cooperatively enclosing the optic;
    at least one inlet for receiving the cooling fluid;
    a pair of coolant fluid flow paths running along the opposing surfaces of the optic for circulating the cooling fluid over the opposing surfaces of the optic; and
    at least one outlet for receiving the cooling fluid after the cooling fluid passes over the opposing surfaces of the optic.

17. The apparatus of claim 16, wherein the at least one inlet comprises a pair of inlets, and wherein the at least one outlet comprises a pair of outlets.

18. The apparatus of claim 16, further comprising a heat exchanger in communication with the at least one outlet, which receives the cooling fluid and helps to cool the cooling fluid.

19. An apparatus configured to transmit power fluxes sufficiently high for carrying out an additive manufacturing operation on a material, the apparatus comprising:

an optic having opposing side surfaces;

a light source configured to generate a light beam adapted to be directed through the optic;

an optic cooling system in flow communication with said optic and enclosing said optic, the optic cooling system including:

a cooling fluid;

a housing having a pair of windows arranged adjacent to the opposing side surfaces of the optic which form a pair of coolant flow paths along the opposing side surfaces, the windows configured to constrain the cooling fluid in contact with the opposing side surfaces of the optic, while enabling transmission of the light beam through the pair of windows, and thus cross-sectionally through the optic; and wherein the cooling fluid circulating over the opposing side surfaces of the optic help to prevent deformation of the optic, and where the cooling fluid is at least transparent to the light beam that is transmitted through the pair of windows, through the optic and through the cooling fluid.

20. The apparatus of claim 19, further comprising a heat exchanger in communication with the optic cooling system for receiving and cooling the cooling fluid after the cooling fluid has passed through the optic cooling system.

21. The apparatus of claim 20, further comprising:

a coolant supply reservoir in communication with the optic cooling system for containing at least a portion of the cooling fluid;

a pump in communication with the coolant supply reservoir and with the optic cooling system, the pump configured to pump a portion of the cooling fluid from the coolant supply reservoir into an inlet of the housing of the optic cooling system.

* * * * *